US010696231B2

United States Patent
Matsuba et al.

(10) Patent No.: US 10,696,231 B2
(45) Date of Patent: Jun. 30, 2020

(54) IN-VEHICLE IMAGE DISPLAY SYSTEM AND IMAGE PROCESSING METHOD

(71) Applicant: Mazda Motor Corporation, Aki-gun, Hiroshima (JP)

(72) Inventors: Yoshiaki Matsuba, Hiroshima (JP); Tomonori Ohtsubo, Hiroshima (JP); Seishi Nakamura, Iwankuni (JP); Naotomo Hashimoto, Kure (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/494,703

(22) PCT Filed: Feb. 28, 2018

(86) PCT No.: PCT/JP2018/007448
§ 371 (c)(1),
(2) Date: Sep. 16, 2019

(87) PCT Pub. No.: WO2018/180142
PCT Pub. Date: Oct. 4, 2018

(65) Prior Publication Data
US 2020/0010019 A1 Jan. 9, 2020

(30) Foreign Application Priority Data
Mar. 31, 2017 (JP) ................. 2017-070303

(51) Int. Cl.
*B60R 1/12* (2006.01)
*G06T 11/40* (2006.01)

(52) U.S. Cl.
CPC .............. *B60R 1/12* (2013.01); *G06T 11/40* (2013.01); *B60R 2001/1253* (2013.01);
(Continued)

(58) Field of Classification Search
CPC .............. B60R 1/12; B60R 2001/1253; B60R 2300/105; B60R 2300/303;
(Continued)

(56) References Cited

U.S. PATENT DOCUMENTS 9,620,009 B2 * 4/2017 Hayasaka ............... G08G 1/166
9,866,752 B2 * 1/2018 Zhang .................. H04N 13/239
(Continued)

FOREIGN PATENT DOCUMENTS

JP 2016143381 A 8/2016
JP 2016167792 A 9/2016

*Primary Examiner* — James M Pontius
(74) *Attorney, Agent, or Firm* — Alleman Hall Creasman & Tuttle LLP

(57) ABSTRACT

Disclosed is an in-vehicle image display device equipped in a vehicle to support driving of a driver. The in-vehicle image display system comprises: a side camera installed to a lateral portion of an exterior of the vehicle to face outwardly and configured to take an image of an area lateral to the vehicle by using a wide-angle lens; a processing unit configured to correct a wide-angle image taken by the side camera to generate a planar image, and process the planar image to generate a processed image; and a display unit configured to display the processed image transmitted from the processing unit on a screen, wherein the processing unit is operable to execute a secondary processing of the planar image so as not to include an image region located outward from the reachable position in a vehicle-width direction, in order to generate the processed image.

4 Claims, 9 Drawing Sheets

(52) U.S. Cl.
CPC ... *B60R 2300/105* (2013.01); *B60R 2300/303* (2013.01); *B60R 2300/8086* (2013.01); *G06T 2207/30252* (2013.01)

(58) Field of Classification Search
CPC ... B60R 2300/8086; B60R 1/00; G06T 11/40; G06T 2207/30252; G06T 1/00; G06T 3/00; B60W 30/06; H04N 7/181; H04N 7/18

See application file for complete search history.

(56) References Cited

U.S. PATENT DOCUMENTS

| | | | |
|---|---|---|---|
| 10,011,227 B2* | 7/2018 | Ishizuka | G06K 9/00805 |
| 10,495,754 B2* | 12/2019 | Chen | G08G 1/167 |
| 2003/0197660 A1* | 10/2003 | Takahashi | G06K 9/00791 |
| | | | 345/7 |
| 2009/0040306 A1* | 2/2009 | Foote | B60R 1/082 |
| | | | 348/148 |
| 2010/0245579 A1* | 9/2010 | Hongo | B60R 1/00 |
| | | | 348/148 |
| 2012/0287232 A1* | 11/2012 | Natroshvili | G06T 7/33 |
| | | | 348/36 |
| 2015/0103159 A1* | 4/2015 | Shashua | G06K 9/00798 |
| | | | 348/118 |
| 2017/0259849 A1* | 9/2017 | Fukukawa | B62D 15/027 |
| 2017/0345310 A1* | 11/2017 | Yoon | B60W 30/0956 |
| 2017/0358056 A1* | 12/2017 | Higuchi | G06T 1/00 |
| 2018/0284399 A1* | 10/2018 | Furutake | B60R 11/04 |
| 2018/0284400 A1* | 10/2018 | Furutake | H04N 5/23238 |
| 2019/0041513 A1* | 2/2019 | Chen | G01S 13/931 |
| 2019/0339704 A1* | 11/2019 | Yu | B26D 15/026 |

* cited by examiner

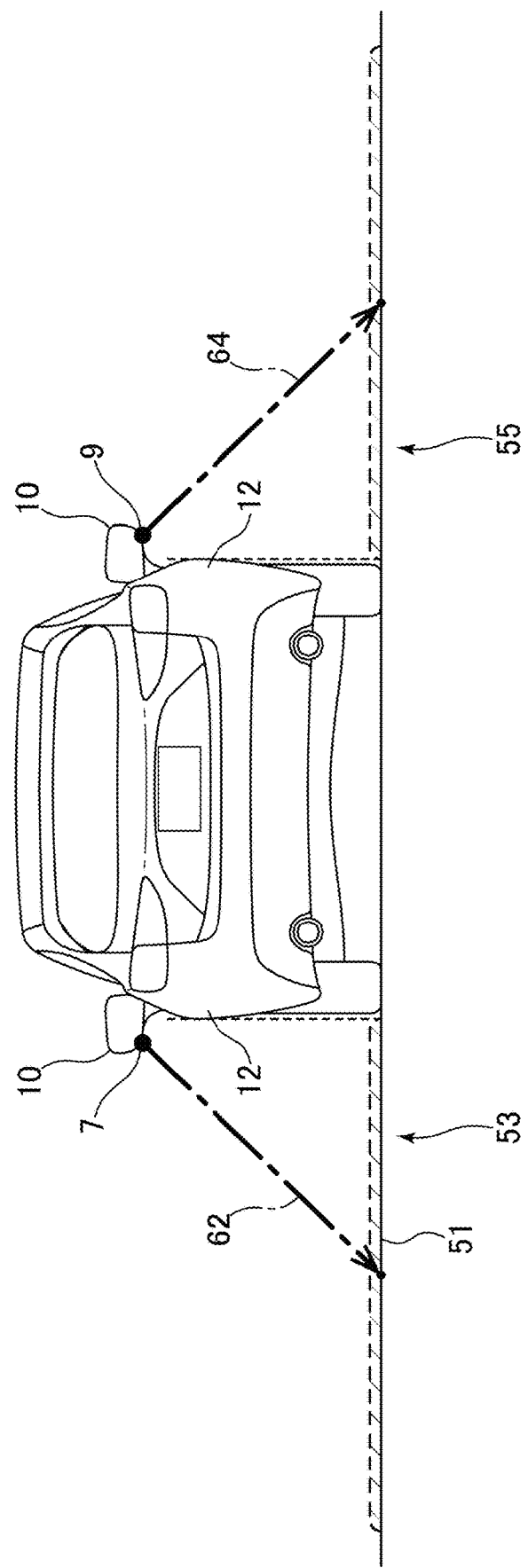

IN-VEHICLE IMAGE DISPLAY SYSTEM AND IMAGE PROCESSING METHOD

TECHNICAL FIELD

The present invention relates to an in-vehicle image display system and an image processing method, and more particularly to an in-vehicle image display system which is equipped in a vehicle to support driving of a driver, and an image processing method.

BACKGROUND ART

Heretofore, there has been known an in-vehicle image display system configured to take images around a vehicle, and display the taken images on a monitor installed in the vehicle, thereby supporting driving of a driver. For example, when the driver is trying to park the vehicle, this system is operable to take an image of an area around the vehicle which is a blind spot of the driver, and display the taken image on the monitor, thereby supporting the driver to check safety of the surroundings of the vehicle. For this purpose, the system employs a camera which is equipped with a wide-angle lens (a fisheye lens or the like), and capable of taking an image in a wider range.

An image taken by the wide-angle lens-equipped camera is formed such that it is gradually compressed (shrunk) in a direction getting away from an optical axis of the lens, resulting in the occurrence of "distortion". This "distortion" leads to difficulty in visual checking of a peripheral region of the image. As means to solve this problem, there has been known an in-vehicle image display system configured to subject an image taken by a wide-angle lens-equipped camera to coordinate conversion, to enable the taken image to be displayed on a monitor in the form of a planar image free of "distortion" (e.g., the following Patent Document 1 or 2).

CITATION LIST

Patent Document

Patent Document 1: JP 2016-143381A
Patent Document 2: JP 2016-167792A

SUMMARY OF INVENTION

Technical Problem

However, in the planar image obtained by subjecting the image taken by the wide-angle lens-equipped camera to coordinate conversion, a peripheral region thereof is composed of a less number of pixels as compared with a central region thereof, so that "blur" occurs in a region of the planar image away from the optical axis. Therefore, there is still the problem that a driver has difficulty in visually checking the peripheral region. Further, generally, an installation position of the camera with respect to a vehicle is determined in consideration of vehicle exterior design and surrounding components, without consideration for "blur" in an image displayed on the monitor. That is, when an area around a vehicle to be watched for safety purposes by a driver is displayed on the monitor, there is a possibility that "blur" occurs in a part of the image, thereby leading to a problem that the driver has difficulty in visually checking the part. This also causes a problem that the driver is preoccupied with checking the "blurred" part, and thus driver's attentiveness to driving is likely to be lowered.

It is therefore an object of the present invention to an in-vehicle image display system and an image processing method which are capable of, when displaying, to a driver, an image taken by a wide-angle lens-equipped camera, preventing lowering of attentiveness of the driver, thereby supporting safety drive of the driver. [Solution to Technical Problem]

In order to solve the above problem, the present invention provides an in-vehicle image display system equipped in a vehicle to support driving of a driver. The in-vehicle image display system comprises: a side camera installed to a lateral portion of an exterior of the vehicle to face outwardly and configured to take an image of an area lateral to the vehicle by using a wide-angle lens; a processing unit configured to correct a wide-angle image taken by the side camera to generate a planar image, and process the planar image to generate a processed image; and a display unit configured to display the processed image transmitted from the processing unit on a screen, wherein the processing unit is operable to set a position of the vehicle at a predetermined setup vehicle speed, as a reference position, wherein the processing unit is operable to set a position which is reached by a part of a contour of the vehicle located at a farthermost position with respect to a center of the vehicle in the reference position as a reachable position, in a position of vehicle where the vehicle has stopped by being decelerated from the reference position under a maximum steering angle and a predetermined braking force, and wherein the processing unit is operable to execute a secondary processing of the planar image so as not to include an image region located outward from the reachable position in a vehicle-width direction, in order to generate the processed image.

In the in-vehicle image display system of the present invention having the above feature, the secondary processing is executed so as not to include an image region of a peripheral road surface section which is located outward, in the vehicle-width direction, of the reachable position and in which "blur" is highly likely to occur. Therefore, the driver can visually check the traveling road surface section to be watched for safety purposes, without being preoccupied with the peripheral road surface section, so that it is possible to prevent distraction of the driver's attentiveness, thereby supporting safety drive of the driver.

Preferably, in the in-vehicle image display system of the present invention, the reachable position is defined based on: a free running distance which is a traveling distance of the vehicle in the vehicle-width direction as measured based on the setup vehicle speed and the maximum steering angle during a time period from a time when the driver recognizes an object through until the driver starts a braking action: and a braking distance which is a traveling distance of the vehicle in the vehicle-width direction as measured based on the setup vehicle speed and the maximum steering angle during a time period from a time when the driver starts the braking action through until the vehicle is stopped. According to this feature, the traveling road surface section in the vehicle-width direction can be set accurately, so that it is possible to adequately perform the secondary processing so as not to include an image region of the peripheral road surface section.

Preferably, in the in-vehicle image display system of the present invention, an optical axis of the wide-angle lens is set to extend toward a give position of a traveling road surface section, such that a contrast ratio in an image region of the traveling road surface section taken until the part of the contour of the vehicle reaches the reachable position becomes 30% or more. According to this feature, no "blur" occurs in the traveling road surface section displayed on the screen, so that the driver can visually check the traveling road surface section in a "blur"-free state.

In order to solve the above problem, the present invention also provides an image processing method for an in-vehicle image display system for supporting driving of a driver. The image processing method comprises the steps of: receiving a wide-angle image taken by a side camera configured to take an image of an area lateral to a vehicle, through a wide-angle lens of the side camera; correcting the wide-angle image to generate a planar image, and processing the planar image to generate a processed image; setting a position of the vehicle at a predetermined setup vehicle speed, as a reference position; setting a position which is reached by a part of a contour of the vehicle located at a farthermost position with respect to a center of the vehicle in the reference position as a reachable position, in a position of vehicle where the vehicle has stopped by being decelerated from the reference position under a maximum steering angle and a predetermined braking force; and executing a secondary processing of the planar image so as not to include an image region located outward from the reachable position in a vehicle-width direction, in order to generate the processed image.

In the present invention having the above feature, there is provided an image processing method in which the secondary processing is executed so as not to include an image region of a peripheral road surface section which is located outward, in the vehicle-width direction, of the reachable position and in which "blur" is highly likely to occur. Therefore, the driver can visually check the traveling road surface section to be watched for safety purposes, without being preoccupied with the peripheral road surface section, so that it is possible to prevent distraction of the driver's attentiveness, thereby supporting safety drive of the driver.

Effect of Invention

The in-vehicle image display system and the image processing method of the present invention are capable of, when displaying, to a driver, an image taken by a wide-angle lens-equipped camera, preventing lowering of attentiveness of the driver, thereby supporting safety drive of the driver.

BRIEF DESCRIPTION OF DRAWINGS

FIG. 6 is a rear view showing the vehicle equipped with the in-vehicle image display system according to this embodiment, in association with a traveling road zone.

DESCRIPTION OF EMBODIMENTS

With reference to the accompanying drawings, an embodiment of the present invention will now be described.

Figure 1A:
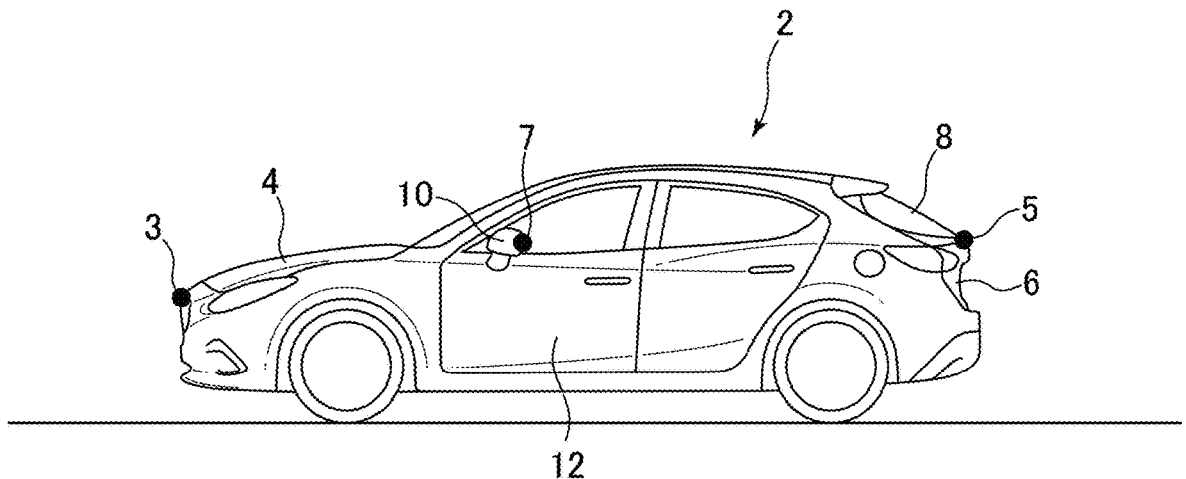
FIG. 1A is a side view showing the entirety of a vehicle equipped with an in-vehicle image display system according to one embodiment of the present invention.
Figure 1B:
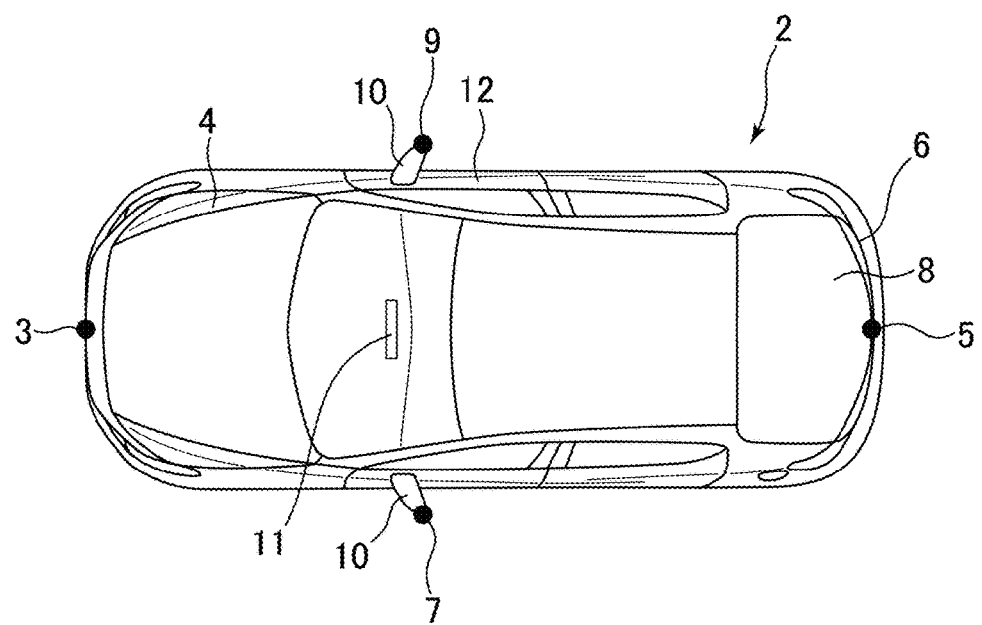
FIG. 1B is a top plan view of the vehicle in FIG. 1A.
Figure 2:
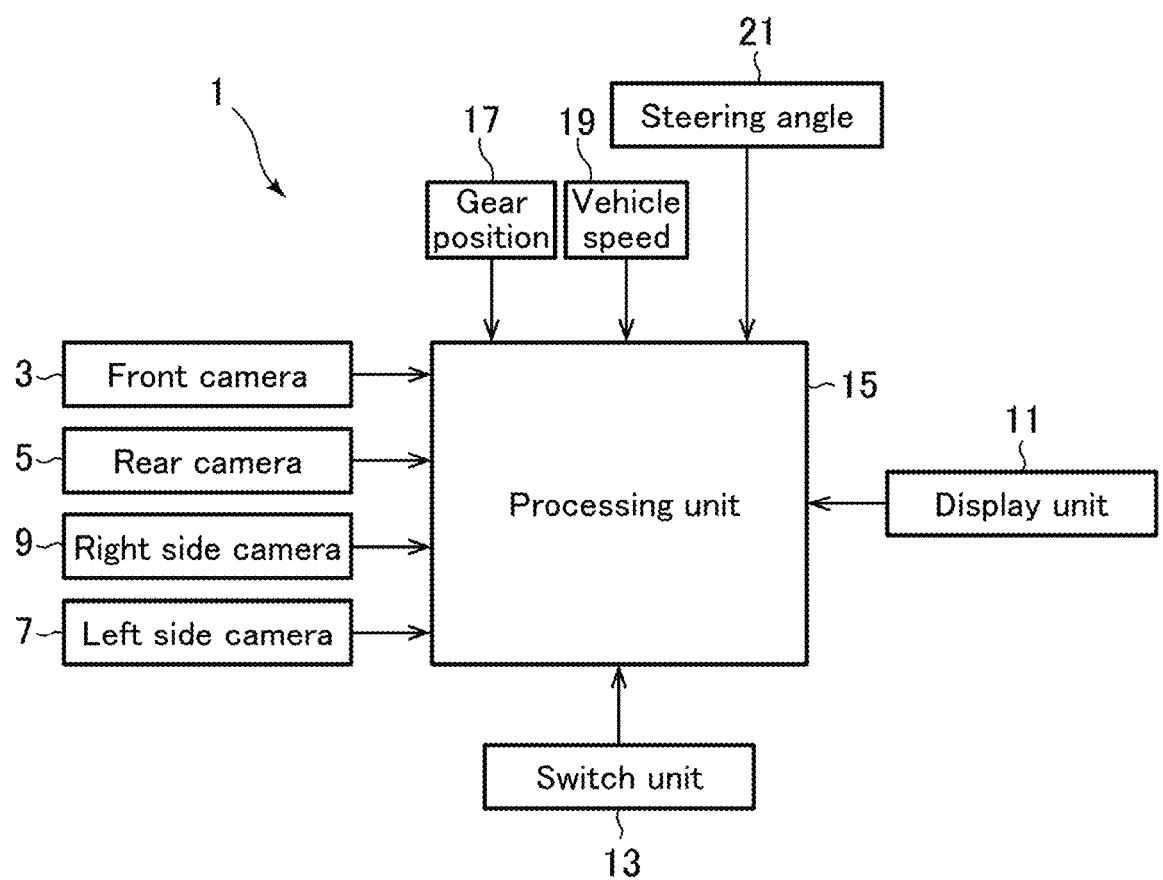
FIG. 2 is a diagram showing a basic configuration of the in-vehicle image display system according to this embodiment.

First of all, with reference to FIGS. 1 and 2, a basic configuration of an in-vehicle image display system according to one embodiment of the present invention will be described. FIG. 1A is a side view showing the entirety of a vehicle equipped with the in-vehicle image display system, and FIG. 1B is a top plan view of the vehicle in FIG. 1A. FIG. 2 is a diagram showing a basic configuration of the in-vehicle image display system.

As used in this specification, a direction along which the vehicle moves forwardly and a direction along which the vehicle moves backwardly are referred to respectively as a front (forward) side and a rear (rearward) side. Further, a vehicle-width direction of the vehicle, a vertical direction, a direction getting away from the vehicle in vehicle-width direction, and a direction getting close to the vehicle are referred to respectively as a right/left (rightward/leftward) side, an upper/lower (upward/downward) side, an outer (outward) side, and an inner (inward) side.

As shown in FIGS. 1 and 2, the in-vehicle image display system 1 is equipped in a vehicle 2, and comprises a front camera 3, a rear camera 5, a left side camera 7, a right side camera 9, a display unit 11, a switch unit 13, and a processing unit 15. The in-vehicle image display system 1 is configured to acquire sensor data from various sensors. The various sensors include a gear position sensor 17, a vehicle speed sensor 19, and a steering angle sensor 21.

Referring to FIG. 1, the front camera 3 is installed to a front portion 4 of an exterior of the vehicle 2, at a vehicle-width directional center of a front edge of the vehicle 2. More specifically, the front camera 3 is installed at a position above an ornament disposed between light and left headlights in the front portion 4. The front camera 3 is equipped with a wide-angle lens, and installed to face forwardly and obliquely downwardly. The wide-angle lens is composed of, e.g., a fisheye lens or an ultrawide-angle lens, and is capable of taking a wide-angle image having an angle-of-view (about 180 degrees) greater than an angle-of-view or field-of-vision of a driver. Thus, the front camera 3 can take an image of a forward part of an area around the vehicle 2 in a wide range through the wide-angle lens. The front camera 3 is communicably connected to the processing unit 15, and operable to transmit data about the taken wide-angle image to the processing unit 15.

The rear camera 5 is installed to a rear portion 6 of the exterior of the vehicle 2, at a vehicle-width directional center of a rear end of the vehicle 2. More specifically, the rear camera 5 is installed at a position above a license plate disposed between light and left backlights in the rear portion 6. In other words, the rear camera 5 is installed at a height position approximately equal to that of a lower edge of a rear windshield glass 8, i.e., in the vicinity of an uppermost edge of the rear end of the rear portion 6 as a blind spot area when the driver looks at the rear windshield glass 8 (in the vicinity of a boundary between the blind spot area and a non-blind spot area). Thus, the rear camera 5 can take an image as if the driver viewed the blind spot area through the rear windshield glass 8. The rear camera 5 is equipped with a wide-angle lens having the same specifications as those of the wide-angle lens of the front camera 3, and installed to face rearwardly and obliquely downwardly. Thus, the rear camera 5 can take an image of a rearward part of the area around the vehicle 2 in a wide range through the wide-angle lens. The rear camera 5 is communicably connected to the processing unit 15, and operable to transmit data about the taken wide-angle image to the processing unit 15.

The left side camera 7 and the right side camera 9 are installed, respectively, to opposite lateral portions 12 of the exterior of the vehicle 2, at positions below left and right door mirrors 10. Each of the left and right side cameras 7, 9 is equipped with a wide-angle lens having the same specifications as those of the wide-angle lens of the front camera 3, and installed to face outwardly and obliquely downwardly. Thus, each of the left and right side cameras 7, 9 can take an image of a lateral part of the area around the vehicle 2 in a wide range through the wide-angle lens. Each of the left and right side cameras 7, 9 is communicably connected to the processing unit 15, and operable to transmit data about the taken wide-angle image to the processing unit 15.

The display unit 11 is equipped with as liquid crystal screen for displaying an image thereon, and installed onto a dashboard at a front end of a passenger compartment of the vehicle 2. Here, a liquid crystal screen for a car navigation system may be additionally used as this display unit 11. The liquid crystal screen of the display unit 11 is installed to face a driver seat to allow the driver to visually check the screen during driving. The display unit 11 is communicably connected to the processing unit 15, and operable to receive image data through the processing unit 15.

The gear position sensor 17 is electrically connected to a speed change mechanism having a plurality of gear sets. The speed change mechanism comprises a reverse gear set for moving the vehicle 2 backwardly, and a plurality of drive gear sets for moving the vehicle 2 forwardly. When the driver manipulates a shift lever to select one of the gear sets, the vehicle 2 is driven to travel in the selected vehicle traveling direction and speed. The gear position sensor 17 is communicably connected to the processing unit 15, and operable to detect a position of the shift lever and transmit gear position data to the processing unit 15.

The vehicle speed sensor 19 is operable to detect an absolute vehicle speed of the vehicle 2. The vehicle speed sensor 19 is communicably connected to the processing unit 15, and operable to transmit the absolute vehicle speed of the vehicle 2 to the processing unit 15.

The steering angle sensor 21 is operable to detect a steering angle. The steering angle sensor 21 is communicably connected to the processing unit 15, and operable to transmit steering angle data to the processing unit 15.

The switch unit 13 is installed in the vicinity of the display unit 11 or the driver seat in the passenger compartment, and comprises a power on-off switch 18 for selectively activating and deactivating the display unit 11 and the cameras, and an image switching switch 20 for switching a type of image on the display unit 11. When the shift lever is set at a position for one of the drive gear sets, the driver can manipulate the image switching switch 20 to select one of a forward image taken by the front camera 3, a forward wide-range image of a wider area taken by the front camera 3, and lateral images taken by the left and right side cameras 7, 9 to display the selected image on the liquid crystal screen. On the other hand, when the shift lever is set at a position for the reverse gear set, the driver can manipulate the image switching switch 20 to select one of a rearward image taken by the rear camera 5, and a rearward wide-range image of a wider area taken by the rear camera 5, to display the selected image on the liquid crystal screen. Each of the switches is communicably connected to the processing unit 15, and operable to transmit a signal therefrom to the processing unit 15.

The processing unit 15 is a CMU (Connectivity Master Unit) and or an ECU (Electronic Control Unit) for generally managing signals and a variety of data. The processing unit 15 is configured to receive data about the wide-angle images taken by the cameras. The professing unit 15 is operable to subject each of the wide-angle images to coordinate conversion so as to correct the wide-angle image, thereby generating a planer image in real time. Simultaneously, the professing unit 15 is operable to subject each of the planer images each corresponding to a respective one of the wide-angle images taken by the left and right side cameras 7, 9 to secondary processing, thereby generating a processed image. Subsequently, the processing unit 15 is operable to transmit data about the processed images. Thus, each of the wide-angle images taken by the left and right side cameras 7, 9 is displayed on the display unit 11 as the processed image. The processing unit 15 is further operable, based on data and signals from the sensors and the switch unit 13, to control a type and content of the processed image to be displayed on the liquid crystal screen of the display unit 11. In this embodiment, the processing unit 15 is configured to execute masking processing as one example of the secondary processing.

Figure 3A:
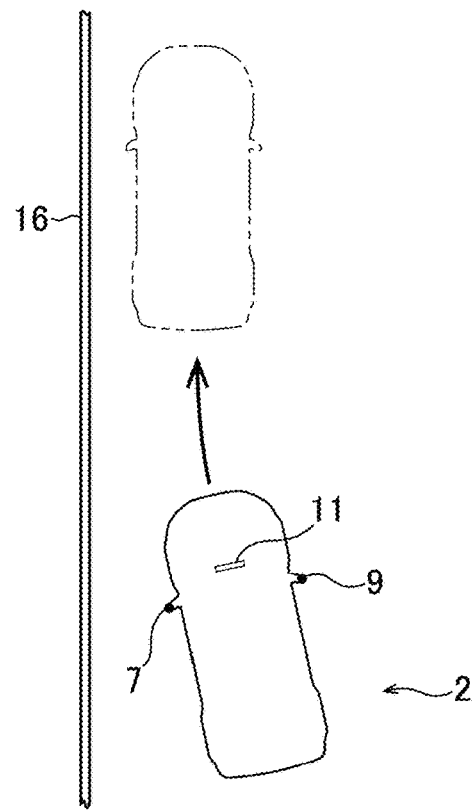
FIG. 3A is a diagram showing a state of vehicle handling using the in-vehicle image display system according to this embodiment.
Figure 3B:
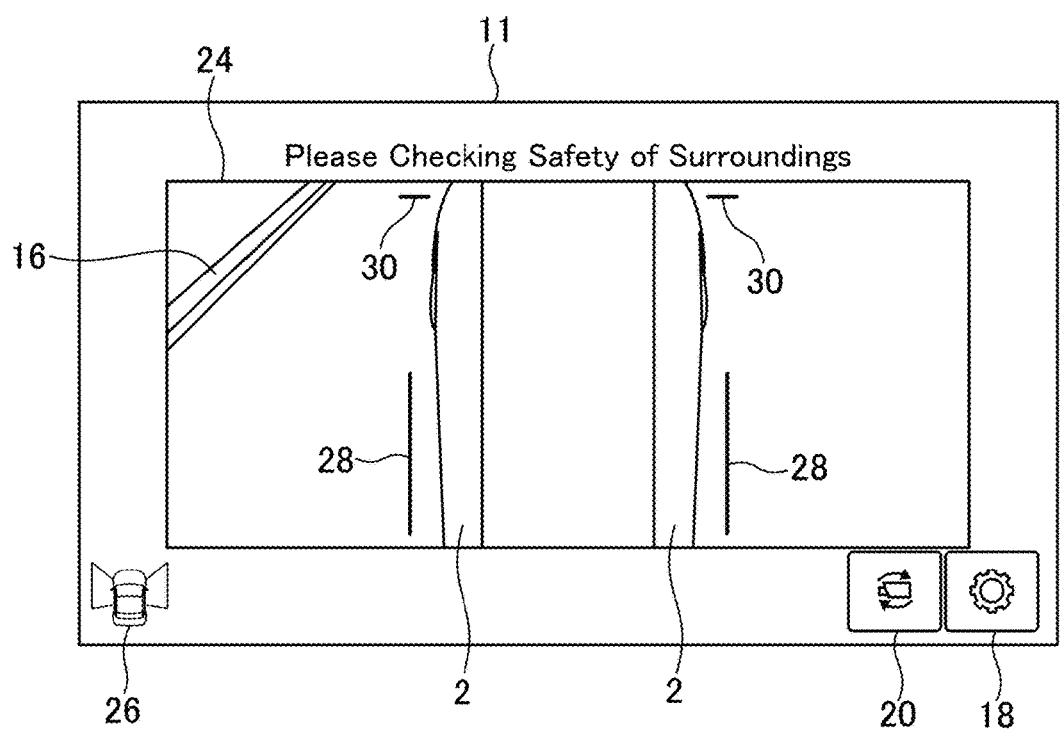
FIG. 3B is a diagram showing a state of display on a liquid crystal display during the vehicle handling in FIG. 3A.
Figure 4A:
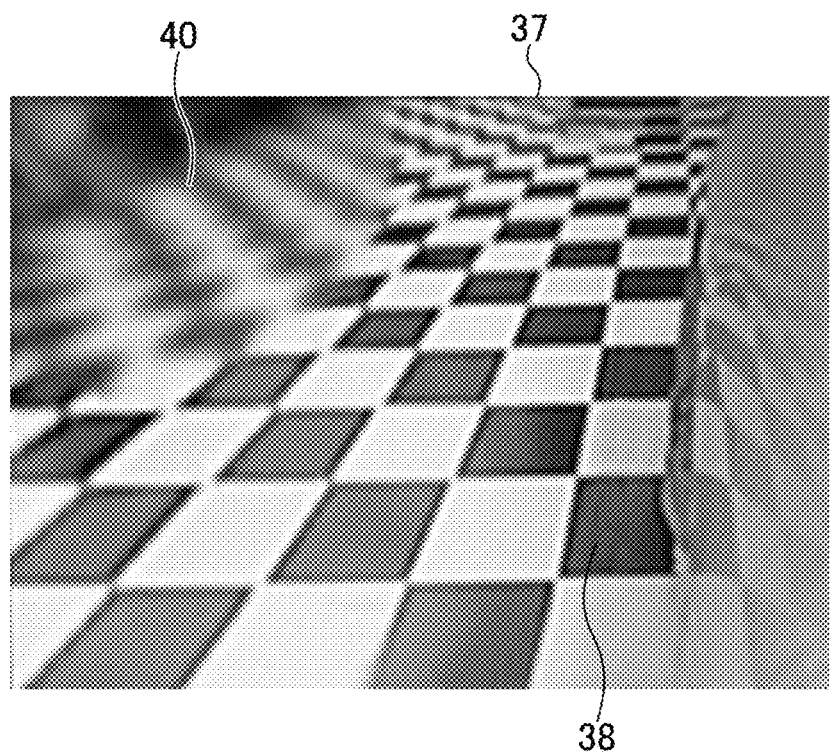
FIG. 4A is a diagram showing an example of a planar image obtained by correcting a wide-angle image taken by a wide-angle lens-equipped camera.
Figure 4B:
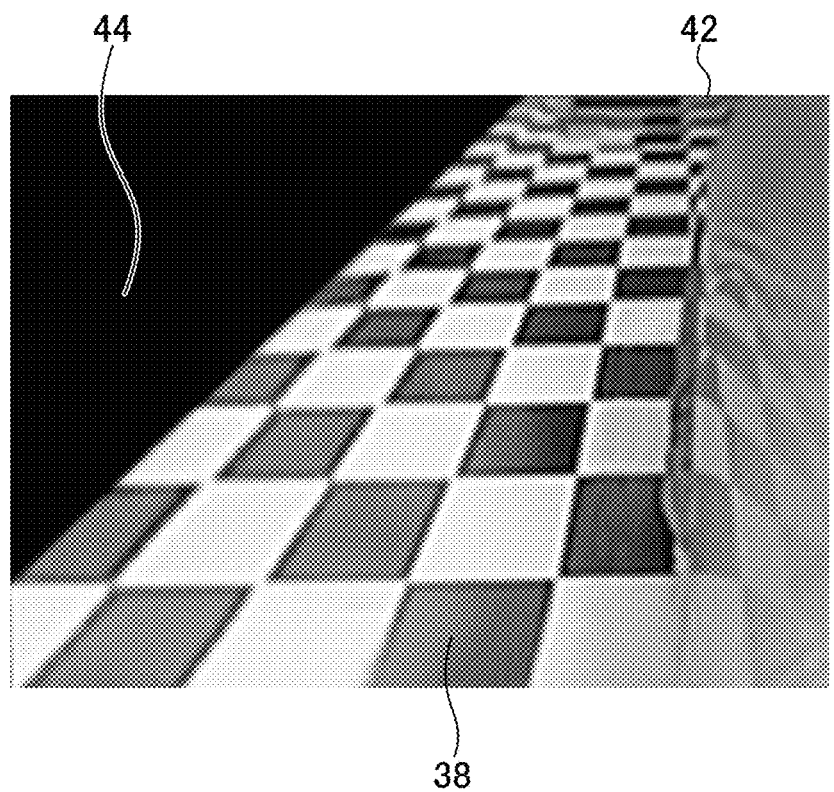
FIG. 4B is a diagram showing an example of a processed image obtained by subjecting the planar image in FIG. 4A to secondary processing.

Next, with reference to FIGS. 3 and 4, a basic concept of the in-vehicle image display system according to this embodiment will be described. FIG. 3A is a diagram showing a state of vehicle handling using the in-vehicle image display system, and FIG. 3B is a diagram showing a state of display on the liquid crystal display during the vehicle handling in FIG. 3A. FIG. 4A is a diagram showing an example of a planar image obtained by correcting a wide-angle image taken by the wide-angle lens-equipped camera, and FIG. 4B is a diagram showing an example of a processed image obtained by subjecting the planar image in FIG. 4A to the secondary processing.

For example, the in-vehicle image display system 1 is used in a situation where the driver is trying to pull the vehicle 2 over along a curb 16 (see FIG. 3A). Upon turn-on of the power on-off switch 18 by the driver, the in-vehicle image display system 1 is activated. Then, when the driver moves the shift lever to the position for one of the drive gear sets, the processing unit 15 operates to display images of surrounding areas lateral to the vehicle 2 taken by the side cameras 7, 9, on the display unit 11. On the liquid crystal display of the display unit 11, a direction-specific image display 24 for displaying various images, an icon 26 indicative of a usage state, the power on-off switch 18, and the image switching switch 20 are displayed (see FIG. 3B).

In the direction-specific image display 24, the image(s) taken by the front camera 3, the rear camera 5, or the left and right side cameras 7, 9 is(are) displayed. For example, in the direction-specific image display 24 in FIG. 3B, left and right lateral images taken by the left and right side cameras 7, 9 are displayed side-by-side. Each of the lateral images includes a parallel-to-vehicle line 28 and a vehicle front edge line 30. The parallel-to-vehicle line 28 is a line indicative of a measure of a vehicle width including the door mirrors 10. The vehicle front edge line 30 is a line indicative of a measure of the front edge of the vehicle 2. An image to be displayed in the direction-specific image display 24 can be switched between the forward image and the forward wide-range image by the image switching switch 20. On the other hand, when the driver moves the shift lever to the position for the reverse gear sets, the rearward image or the rearward wide-range image can be displayed according to the image switching switch 20.

The icon 26 denotes the position of the camera taking the image currently displayed on the direction-specific image display 24.

As above, the vehicle-surrounding image of a blind spot area of the driver taken by each of the cameras is displayed on the liquid crystal screen of the display unit 11. Thus, the driver can drive the vehicle 2 while checking safety of the surroundings of the vehicle by the liquid crystal screen of the display unit 11.

Preferably, the processing unit is operable, when determining that the absolute vehicle speed detected by the vehicle speed sensor 19 exceeds 15 km/h, to stop the screen display of the display unit 11. As a result, any image in the direction-specific image display 24 is turned off The lens used in each of the cameras of the in-vehicle image display system 1 is composed of a wide-angle lens such as a fisheye lens and an ultrawide-angle lens, wherein any taken wide-angle image is displayed as a circular image. A peripheral region of the wide-angle image is more largely compressed as compared with a central region thereof, so that "distortion" gradually becomes larger in a direction getting away from the optical axis of the lens. This causes difficulty in visual checking in the peripheral region where the "distortion" occurs.

In order to solve the "distortion" of the wide-angle image, the processing unit 15 operates to correct the wide-angle image by means of coordinate conversion to generate a planer image, as shown in FIG. 4A. A planar image 37 shown in FIG. 4A is a part of the planer image obtained by correcting the wide-angle image. As a result of the correction by means of coordinate conversion, a peripheral region 40 of the planar image 37 is composed of a less number of pixels as compared with a central region 38 thereof, i.e., is insufficient in terms of the number of pixels. Therefore, there is still the problem that the driver has difficulty in visually checking the peripheral region. Specifically, in the planar image 37, "blur" gradually becomes larger in a direction going away from the optical axis (not illustrated). That is, the peripheral region 40 has a contrast ratio of less than 30%, and exhibits "blur", so that it is not suitable to enable the driver to visually check an imaged object. On the other hand, the central region 38 of the planar image 37 has a contrast ratio of 30% or more, and exhibits almost no "blur", so that it is suitable to enable the driver to visually check an imaged object.

As above, in the planer image 37, the central region 38 is suitable to enable the driver to visually check an imaged object, and the peripheral region 40 is not suitable to enable the driver to visually check an imaged object. When a traveling road surface section to be watched by the driver during driving is displayed in the central region 38, the driver can immediately visually check the traveling road surface section. However, if a peripheral roar surface zone other than the traveling road surface section is additionally displayed in the peripheral region 40, due to the "blur" occurring in the peripheral region 40, the driver is preoccupied with checking the peripheral roar surface zone, and thus driver's attentiveness to driving is likely to be lowered.

FIG. 4B shows a processed image 42 obtained when the processing unit 15 operates to subject the planer image 37 to the secondary processing. In the processed image 42, a part of an image region of the peripheral roar surface zone comprised in the peripheral region 40 is hidden as a processed region 44, and an image region of the traveling road surface section comprised in the central region 38 is displayed directly. In this case, a part of the processed image region of the peripheral roar surface zone is an image region located outward of a position away from one of the lateral portions 12 of the vehicle in the vehicle-width direction by a given distance. Therefore, the driver can visually check the traveling road surface section without being preoccupied with checking of the peripheral road surface section in which "bure" occurs.

Next, with reference to FIG. 5, the definition of "blur" in this embodiment will be described. FIG. 5 is the explanatory diagram of a relationship between "blur" and the contract ratio.

Figure 5A:
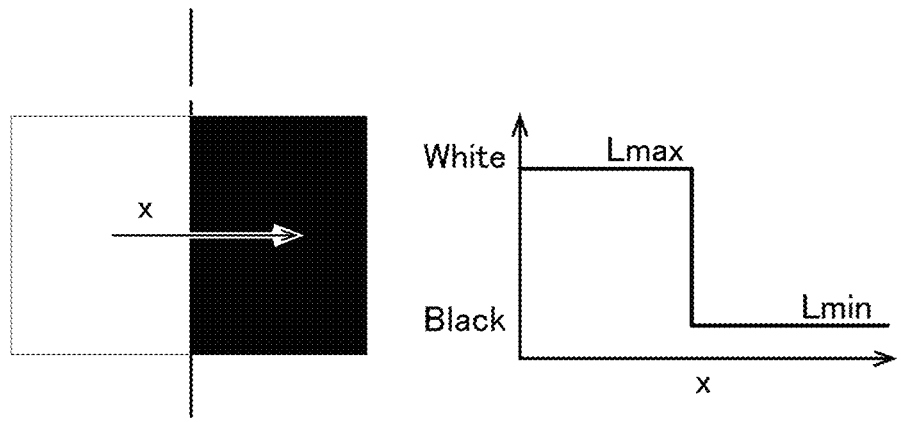
FIG. 5A is an explanatory diagram of a relationship between "blur" and a contract ratio, wherein the contract ratio is 100%.
Figure 5B:
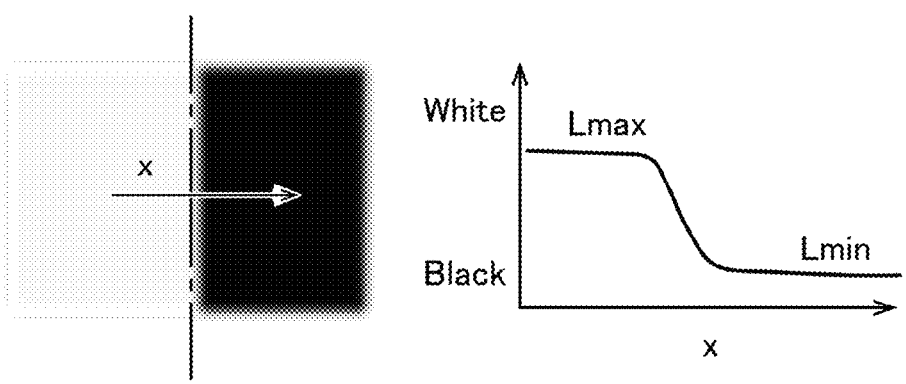
FIG. 5B is an explanatory diagram of a relationship between "blur" and the contract ratio, wherein the contract ratio is 30%.
Figure 5C:
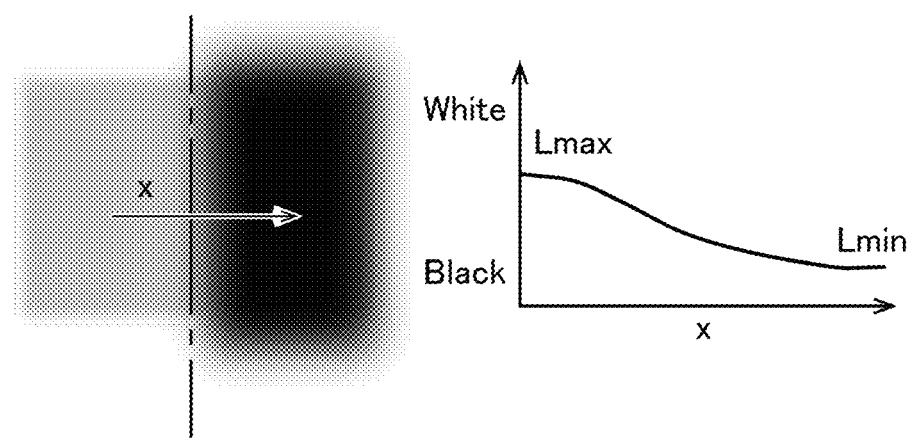
FIG. 5C is an explanatory diagram of a relationship between "blur" and the contract ratio, wherein the contract ratio is 10%.

As one example, "blur" is defined by the contrast ratio. The contrast ratio means a value obtained by dividing a minimum luminance value Lmin of pixels within a given width range from an arbitrary boundary by a maximum luminance value Lmax of pixels within a given width range from the arbitrary boundary (contrast ratio=L min/L max× 100). As shown in FIGS. 5A to 5C, when the contrast ratio is 100% (FIG. 5A), no "blur" occurs, and the driver can visually check an imaged object vividly. When the contrast ratio is 30% (FIG. 5B), "blur" occurs to a certain degree. However, 30% is a limit value allowing the driver to visually check the imaged object vividly. When the contrast ratio is 10% (FIG. 5C), "blur" fairly occurs, so that the driver has difficulty in visually checking the imaged object. That is, a condition that the contrast ratio is 30% or more is suitable to enable the driver to visually check the imaged object.

In this embodiment, a threshold of the contrast ratio suitable for visual checking by the driver is set to 30%. However, this threshold may be changed depending on the size of the imaged object or the like. For example, in a case where a relatively small-size object is imaged by a camera, it is desirable to set the threshold to greater than 30%

Figure 7:
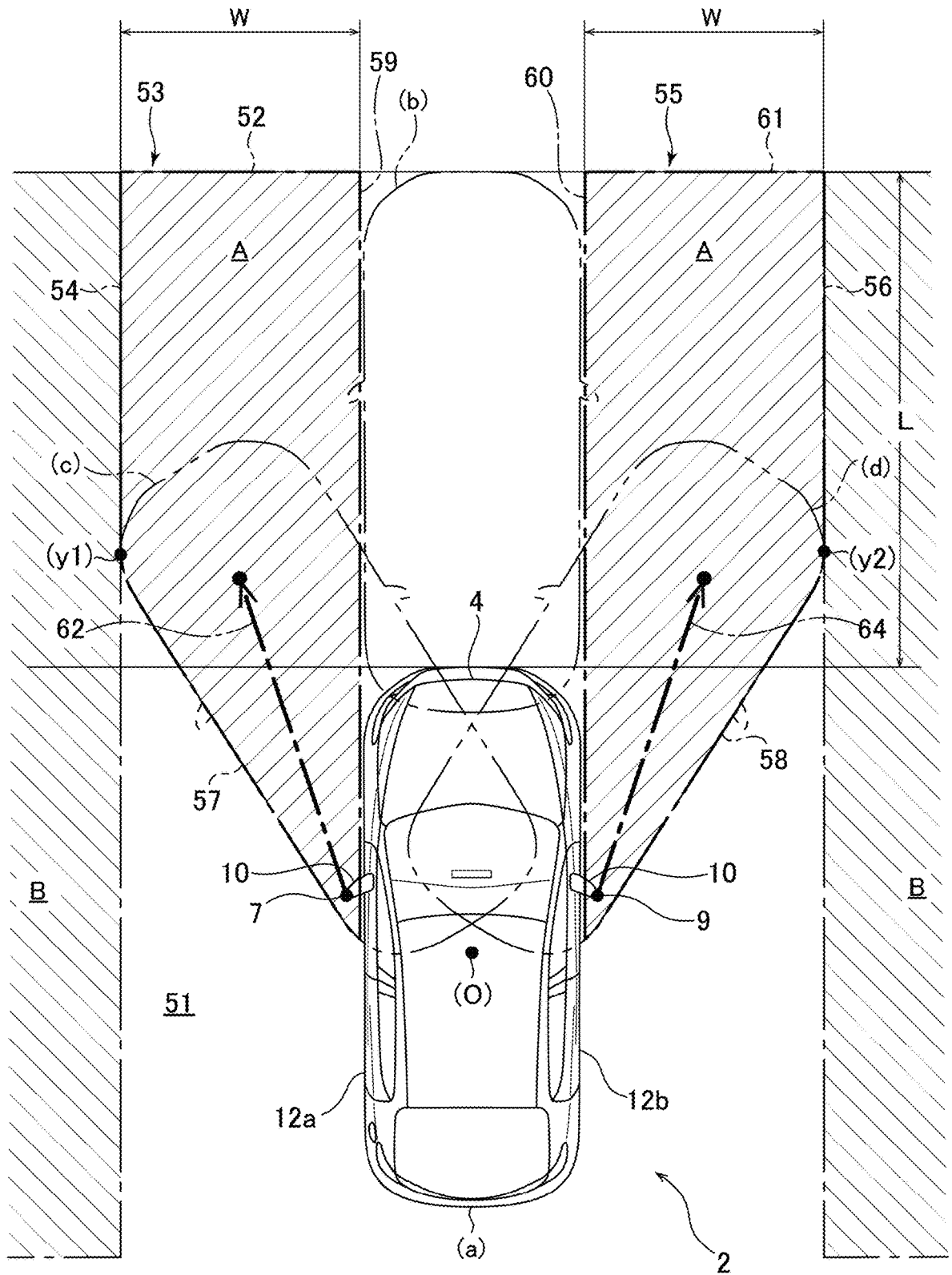
FIG. 7 is a top plan view of the vehicle in FIG. 6.

Next, with reference to FIGS. 6 and 7, features of the in-vehicle image display system according to this embodiment will be described. FIG. 6 is a rear view showing the vehicle equipped with the in-vehicle image display system according to this embodiment, in association with the traveling road zone. FIG. 7 is a top plan view of the vehicle in FIG. 6.

As shown in FIGS. 6 and 7, the left and right side cameras 7, 9 are installed below the left and right door mirrors 10 on the left and right lateral portions 12a, 12b, respectively. In a road surface 51 in a range in which the left and right side cameras 7, 9 take images, a left movable zone 53 in which the vehicle 2 is movable during a time period after the vehicle 2 is driven forwardly under a leftward maximum steering angle and a setup vehicle speed through until the vehicle 2 is stopped, and a right movable zone 55 in which the vehicle 2 is movable during a time period after the vehicle 2 is driven forwardly under a rightward maximum steering angle and the setup vehicle speed through until the vehicle 2 is stopped, are set.

The left movable zone 53 is a zone surrounded by a front edge line 52, a rear edge line 57, an outer edge line 54, and an inner edge line 59. On the other hand, the right movable zone 55 is a zone surrounded by a front edge line 61, a rear edge line 58, an outer edge line 56, and an inner edge line 60. Each of the left movable zone 53 and the right movable zone 55 is a traveling road surface section A to be watched by the driver for safety purposes in the range in which a respective one of the left and right side cameras 7, 9 takes images, when pulling the vehicle 2 over. Further, a region outside the movable zone 53 (55) (traveling road surface section A) is a peripheral road surface section B in which a need for the driver to watch it when pulling the vehicle 2 over is relatively low.

The front edge lines 52, 61 are at a reachable position in a vehicle traveling direction, which can be reached by the front edge of the vehicle 2, during a time period after the vehicle 2 is driven forwardly at the setup vehicle speed through until the vehicle 2 is stopped (during a time period during which the vehicle 2 moves from a certain reference position (a) to a vehicle position (b)). In other words, on an assumption that the reference position (a) is defined as a position of the vehicle 2 as measured at a certain time when the vehicle 2 is traveling at a predetermined setup vehicle speed, the front edge lines 52, 61 are at a reachable position to be reached by a contour of the front portion 4 of the vehicle 2 located at the farthermost position in the vehicle traveling direction, with respect to the center (O) of the vehicle 2 in the reference position (a), in a state in which the vehicle 2 has been decelerated from the reference position (a) under a predetermined braking force and finally stopped. Each of the front edge lines 52, 61 extends in the vehicle-width direction in parallel with a contour line of the front portion 4 of the vehicle 2 in the reference position (a).

The left outer edge line 54 is at a reachable position in the vehicle-width direction, which can be reached by a corner (y1) between the front portion 4 and the left lateral portion 12a, during a time period after the vehicle 2 is driven forwardly under a leftward maximum steering angle and the setup vehicle speed through until the vehicle 2 is stopped (during a time period during which the vehicle 2 moves from the certain reference position (a) to a vehicle position (c)). In other words, on the assumption that the reference position (a) is defined as a position of the vehicle 2 as measured at a certain time when the vehicle 2 is traveling at the predetermined setup vehicle speed, the left lateral edge line 54 is at a reachable position to be reached by a contour (y1) of the left lateral portion 12a of the vehicle 2 located at the farthermost position in the vehicle-width direction, with respect to the center (O) of the vehicle 2 in the reference position (a), in a state in which the vehicle 2 has been decelerated from the reference position (a) under a leftward maximum steering angle and a predetermined braking force generated by, e.g., a brake pedal depressed by the driver, and finally stopped. Each of the left outer edge line 54 extends in the vehicle traveling direction in parallel with a contour line of the left lateral portion 12a of the vehicle 2 in the reference position (a).

The right outer edge line 56 is at a reachable position in the vehicle-width direction, which can be reached by a corner (y2) between the front portion 4 and the right lateral portion 12b, during a time period after the vehicle 2 is driven forwardly under a rightward maximum steering angle and the setup vehicle speed through until the vehicle 2 is stopped (during a time period during which the vehicle 2 moves from the certain reference position (a) to a vehicle position (d)). In other words, on the assumption that the reference position (a) is defined as a position of the vehicle 2 as measured at a certain time when the vehicle 2 is traveling at the predetermined setup vehicle speed, the right lateral edge line 56 is at a reachable position to be reached by a part (y2) of a contour of the right lateral portion 12b of the vehicle 2 located at the farthermost position in the vehicle-width direction, with respect to the center (O) of the vehicle 2 in the reference position (a), in a state in which the vehicle 2 has been decelerated from the reference position (a) under a rightward maximum steering angle and a predetermined braking force generated by, e.g., a brake pedal depressed by the driver, and finally stopped. Each of the right outer edge line 56 extends in the vehicle traveling direction in parallel with a contour line of the right lateral portion 12b of the vehicle 2 in the reference position (a).

On the assumption that a position of the vehicle 2 as measured at a certain time when the vehicle 2 is traveling at the predetermined setup vehicle speed is defined as the reference position (a), the left rear edge line 57 is at a reachable position which can be reached by the contour of the left lateral portion 12a of the vehicle 2, in a state in which the vehicle 2 has been decelerated from the reference position (a) under the leftward maximum steering angle and the predetermined braking force generated by, e.g., a brake pedal depressed by the driver, and finally stopped.

Further, on the assumption that a position of the vehicle 2 as measured at a certain time when the vehicle 2 is traveling at the predetermined setup vehicle speed is defined as the reference position (a), the right rear edge line 58 is at a reachable position which can be reached by the contour of the right lateral portion 12b of the vehicle 2, in a state in which the vehicle 2 has been decelerated from the reference position (a) under the rightward maximum steering angle and the predetermined braking force generated by, e.g., a brake pedal depressed by the driver, and finally stopped.

The inner edge line 59 (60) of the movable zone 53 (55) is a line which extends in the vehicle traveling direction along the contour line of the left lateral portion 12a (right lateral portion 12b) of the vehicle 2, at a position of the lateral edge of the left lateral portion 12a (right lateral portion 12b) in the reference position (a). Further, a region located inward of these inner edge lines is hidden by the vehicle 2. Thus, each of the inner edge lines 59, 60 is a line representing a vehicle-width directional inward limit of the road surface 51 whose image can be taken by a respective one of the left and right cameras 7, 9.

A maximum distance L in the vehicle traveling direction of the movable zone 53(55) is a distance from the front edge of the vehicle 2 to the front edge line 52 (61) (the reachable position in the vehicle traveling direction). More specifically, on the assumption that the reference position (a) is defined as a position of the vehicle 2 as measured at a certain time when the vehicle 2 is traveling at the setup vehicle speed V, the maximum distance L is defined as a distance by which a part of the contour of the front portion 4 located at the farthermost position in the vehicle traveling direction, with respect to the center (O) of the vehicle 2 in the reference position (a), moves in the vehicle traveling direction during a time period after the vehicle 2 is decelerated from the reference position (a) under the predetermined braking force through until the vehicle 2 is stopped in the vehicle position (b).

Further, the maximum distance L is calculated as a sum of a free running distance L1 which is a traveling distance of the vehicle 2 in the vehicle traveling direction as measured based on the setup vehicle speed V during a time period from a time when the driver recognizes an object through until the driver starts a braking action, and a braking distance L2 which is a traveling distance of the vehicle 2 in the vehicle traveling direction as measured based on the setup vehicle speed V during a time period from a time when the driver starts the braking action through until the vehicle 2 is stopped (L=L1+L2).

The setup vehicle speed is a prescribed fixed value, and set to a value of 15 km/h or less, assuming pulling-over.

The free running distance L1 is a distance obtained by adding a time period t1 after the driver look at the liquid crystal screen through until the driver recognizes an object to a time period t2 after the driver recognizes the object through until the driver starts a braking action, and multiplying the resulting sum by the setup vehicle speed (L1=(t1+t2)×V). The time periods t1, t2 are prescribed fixed values, and set, respectively, to 0.5 s and 0.75 s.

The braking distance L2 is a distance obtained by dividing the setup vehicle speed $V^2$ by a value derived by multiplying a product of a friction coefficient μ and a gravitational acceleration G by 2 (L2=$V^2$/(2×μ×G)).

A maximum distance W in the vehicle-width direction of the movable zone 53 (55) is a distance from the inner edge line 59 (60) to the outer edge line 54 (56). More specifically, on the assumption that the reference position (a) is defined as a position of the vehicle 2 as measured at a certain time when the vehicle 2 is traveling at the setup vehicle speed V, the maximum distance W is defined as a distance by which the corner y1 (y2) between the front portion 4 and the left lateral portion 12a (right lateral portion 12b) moves in the vehicle-width direction during a time period after the vehicle 2 is decelerated from the reference position (a) under the leftward maximum steering angle (rightward maximum steering angle) and the predetermined braking force through until the vehicle 2 is stopped in the vehicle position (c) or the vehicle position (d).

Further. the maximum distance W is calculated as a sum of a free running distance W1 which is a traveling distance of the vehicle 2 in the vehicle-width direction as measured based on the setup vehicle speed V and the leftward maximum steering angle (rightward maximum steering angle) during a time period from a time when the driver recognizes an object through until the driver starts a braking action, and a braking distance W2 which is a traveling distance of the vehicle 2 in the vehicle-width direction as measured based on the setup vehicle speed V and the leftward maximum steering angle (rightward maximum steering angle) during a time period from a time when the driver starts the braking action through until the vehicle 2 is stopped (W=W1+W2).

As shown in FIGS. 6 and 7, an optical axis 62 (64) of the wide-angle lens of the right side camera 7 (left side camera 9) is set to incline with respect to the vertical line by a given angle and extend toward a given position of the traveling road surface section A so as to allow the entire surface of the traveling road surface section A to be included in the central region 38 of the planer image 37. In other word, each of the optical axes 62, 64 is set to extend toward a given position of the traveling road surface section A, such that the contrast ratio in an image region of the traveling road surface section A displayed on the display unit 11 becomes 30% or more.

Further, the optical axis 62 (64) of the wide-angle lens is set to extend forwardly and obliquely outwardly so as to intersect an approximately central region of the traveling road surface section A in the vehicle traveling direction (forward-rearward direction) and an approximately central region of the traveling road surface section A in the vehicle-width direction (rightward-leftward direction). The planer image 37 imaged through the above wide-angle lens is formed such that the traveling road surface section A is included in the central region 38, and the peripheral road surface section B is included in the peripheral region 40.

The processing unit 15 operates to subject this planer image 37 to the secondary processing so as not to include at least a part of an image region of the peripheral road surface section B, to generate a processed image 42. More specifically, the processing unit 15 operates to display an image region of the traveling road surface section A, while hiding, as a processed section 44, the image region of the peripheral road surface section B located outward of each of the outer edge lines 54, 56. However, the present invention is not limited to the above embodiment in which only the image region of the peripheral road surface section B located outward of each of the outer edge lines 54, 56 is hidden as the processed section, but may be configured to hide, as the processed section, an image region located forward (farther), in the vehicle traveling direction, of each of the front edge lines 52, 61, or an image region located rearward, in the vehicle traveling direction, of each of the rear edge lines 57, 58, or may be configured to hide, as the processed section, the entire peripheral road surface section B.

Figure 8:
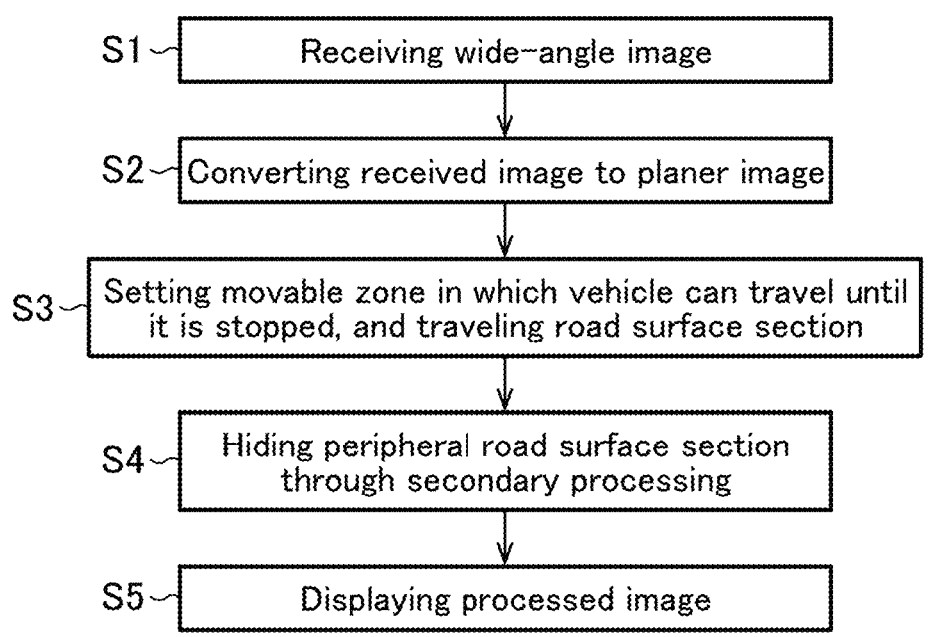
FIG. 8 is a flowchart showing an image processing method used in the in-vehicle image display system according to this embodiment.

Next, with reference to FIG. 8, an image processing method to be performed by the processing unit 15 in this embodiment will be described. FIG. 8 is a flowchart showing the image processing method. In FIG. 8, "S" denotes step.

As shown in FIG. 8, first of all, in S1, the processing unit 15 operates to receive data about wide-angle images of the surroundings of the vehicle 2 taken by the left and right side cameras 7, 9 through the wide-angle lenses.

Subsequently, in S2, the processing unit 15 operates to correct each of the wide-angle images received in S1 by means of coordinate conversion, to generate a planar image.

In S3, the processing unit 15 operates to calculate, based on the setup vehicle speed V (e.g., 15 km/h) and the maximum steering angle of the vehicle, the maximum movable distance L in the vehicle traveling direction and the maximum movable distance W in the vehicle-width direction. Then, the processing unit 15 operates to set the traveling road surface section A on each of the movable zones 53, 55 in which the vehicle 2 can travel during a time period from a time when the driver recognizes an object through until the vehicle 2 is stopped from the setup vehicle speed V. In other words, a region outside the movable zone 53 (55) (traveling road surface section A) is set as a peripheral road surface section B in which a need for the driver to watch it when pulling the vehicle 2 over is relatively low.

Subsequently, in S4, the processing unit 15 operates to subject the planar image 37 to secondary processing so as not to include at least a part of the peripheral road surface section B to generate a processed image 42. In this way, at least a part of the peripheral road surface section B is hidden as the processed section 44. Specifically, an image region of the peripheral road surface section B located outward of the outer edge line 54 (56) is hidden as the processed section 44. However, the present invention is not limited to the above embodiment in which only the image region of the peripheral road surface section B located outward of each of the outer edge lines 54, 56 is hidden as the processed section, but may be configured to hide, as the processed section, an image region located forward (farther), in the vehicle traveling direction, of each of the front edge lines 52, 61, or an image region located rearward, in the vehicle traveling direction, of each of the rear edge lines 57, 58, or may be configured to hide, as the processed section, the entire peripheral road surface section B.

In S5, the processing unit 15 operates to transmit the processed image 42 to the display unit 11. Then, the flow of the image processing method is completed.

Next, (functions) advantageous effects of this embodiment will be described.

The in-vehicle image display system 1 according to this embodiment comprises: a side camera (7, 9) installed to a lateral portion (12a, 12b) of an exterior of a vehicle 2 to face outwardly and configured to take an image of an area lateral to the vehicle 2 by using a wide-angle lens; a processing unit 15 configured to correct a wide-angle image taken by the side camera (7, 9) to generate a planar image 37, and process the planar image 37 to generate a processed image 42; and a display unit 11 configured to display the processed image 42 transmitted from the processing unit 15 on a screen. The processing unit 15 is operable, on an assumption that: a position of the vehicle as measured at a certain time when the vehicle is traveling at a predetermined setup vehicle speed is set as a reference position (a); and a position reached by a corner (y1, y2) of a contour of the vehicle located at the farthermost position with respect to the center (O) of the vehicle in the reference position (a), in a state in which the vehicle has been decelerated from the reference position (a) under a maximum steering angle and a predetermined braking force and finally stopped is set as a reachable position, to subject the planar image 37 to secondary processing so as not to include an image region located outward, in a vehicle-width direction, of the reachable position (outer edge line (54, 56)).

In the in-vehicle image display system according to this embodiment, the processed image 42 is displayed which is subjected to the secondary processing so as not to include an image region of a peripheral road surface section B which is other than a traveling road surface section A to be watched by a driver for safety purposes, and in which "blur" is highly likely to occur, wherein the peripheral road surface section B is located outward, in the vehicle-width direction, of the reachable position (outer edge line (54, 56)) at which the vehicle 2 having traveled under the maximum steering angle and the setup vehicle speed is stopped. Therefore, the driver can visually check the traveling road surface section A without being preoccupied with the peripheral road surface section B, so that it is possible to prevent distraction of the driver's attentiveness, thereby supporting safety drive of the driver.

Preferably, in the in-vehicle image display system according to this embodiment, the reachable position (outer edge line (54, 56)) is defined based on: a free running distance W1 which is a traveling distance of the vehicle in the vehicle-width direction as measured based on the setup vehicle speed V and the maximum steering angle during a time period from a time when the driver recognizes an object through until the driver starts a braking action: and a braking distance W2 which is a traveling distance of the vehicle in the vehicle-width direction as measured based on the setup vehicle speed V and the maximum steering angle during a time period from a time when the driver starts the braking action through until the vehicle is stopped. According to this feature, the traveling road surface section A in the vehicle-width direction can be set accurately, so that it is possible to adequately perform the secondary processing so as not to include an image region of the peripheral road surface section B.

Preferably, in the in-vehicle image display system according to this embodiment, an optical axis (62, 64) of the wide-angle lens is set to extend toward a give position of the traveling road surface section A, such that a contrast ratio in an image region of the traveling road surface section A on the movable zone (53, 55) in which the vehicle 2 can travel to a reachable position (outer edge line (54, 56) becomes 30% or more. According to this feature, no "blur" occurs in the traveling road surface section A displayed on the screen, so that the driver can visually check the traveling road surface section A in a "blur"-free state.

The image processing method for use in the in-vehicle image display system 1 according to this embodiment comprises the steps of: receiving a wide-angle image taken by a side camera (7, 9) configured to take an image of an area lateral to a vehicle 2, through a wide-angle lens of the side camera; correcting the wide-angle image to generate a planar image 37, and processing the planar image 37 to generate a processed image 42; and on an assumption that: a position of the vehicle as measured at a certain time when the vehicle is traveling at a predetermined setup vehicle speed V is set as a reference position (a); and a position reached by a corner (y1, y2) of a contour of the vehicle located at the farthermost position with respect to the center (O) of the vehicle in the reference position (a), in a state in which the vehicle has been decelerated from the reference position (a) under a maximum steering angle and a predetermined braking force and finally stopped is set as a reachable position, subjecting the planar image 37 to secondary processing so as not to include an image region located outward, in a vehicle-width direction, of the reachable position (outer edge line (54, 56)).

In the image processing method in this embodiment, the secondary processing is executed so as not to include an image region of a peripheral road surface section B which is other than a traveling road surface section A to be watched by a driver for safety purposes, and in which "blur" is highly likely to occur, wherein the peripheral road surface section B is located outward, in the vehicle-width direction, of the reachable position (outer edge line (54, 56)) at which the vehicle 2 having traveled under the maximum steering angle and the setup vehicle speed is stopped. Therefore, the driver can visually check the traveling road surface section A without being preoccupied with the peripheral road surface section B, so that it is possible to prevent distraction of the driver's attentiveness, thereby supporting safety drive of the driver.

Figure 9:
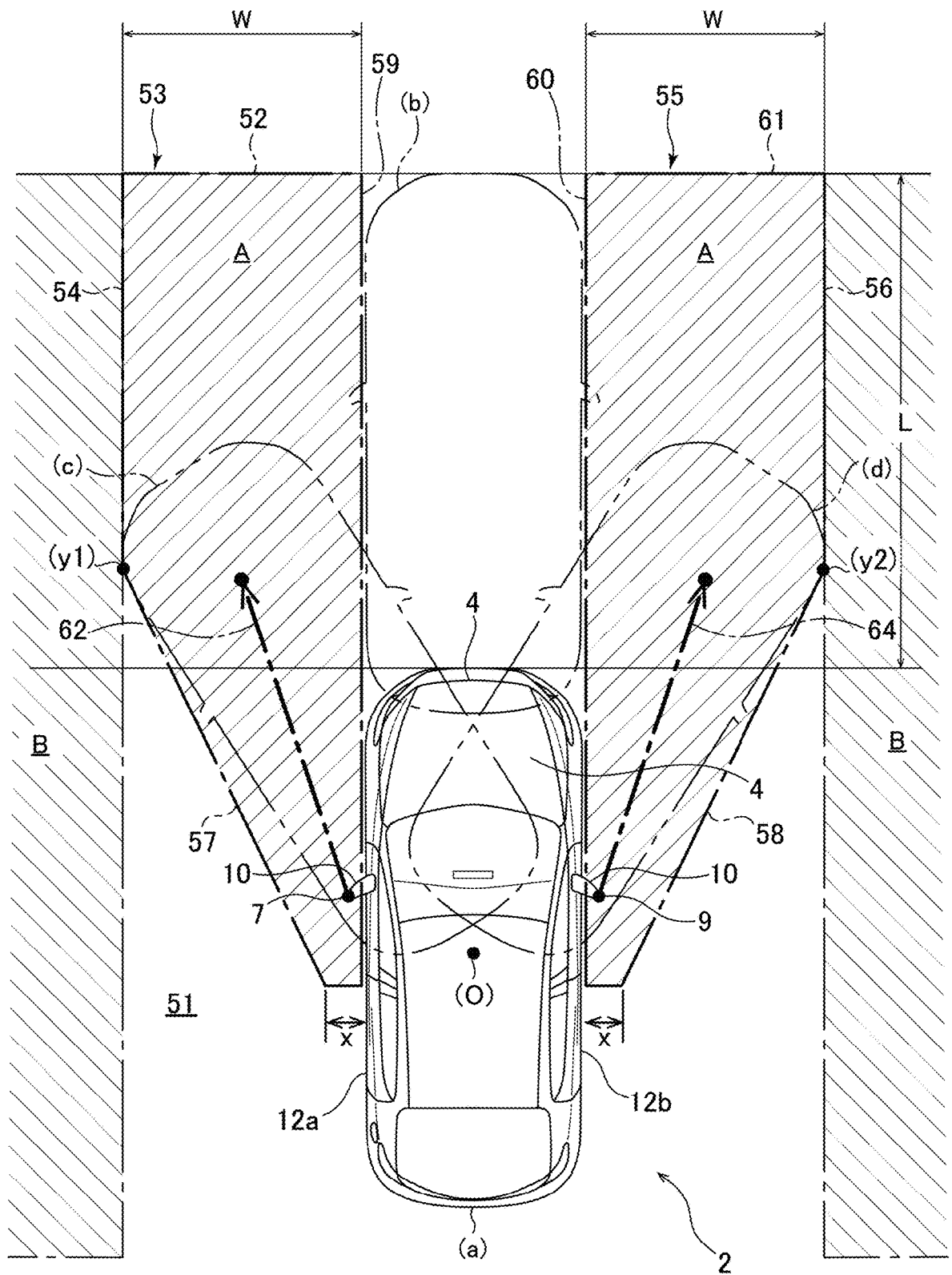
FIG. 9 is a top plan view a vehicle equipped with an in-vehicle image display system according to one embodiment of the present invention, in association with a traveling road zone.

It should be noted that the present invention is not limited to the above embodiment, but various changes and modifications may be made therein without departing from the spirit and scope of the invention as set forth in appended claims. For example, as another embodiment, the traveling road surface section A in the above embodiment may be expanded such that each of the rear edge line 57 of the left movable zone 53 and the rear edge line 58 of the right movable zone 55 is set to intersect a corresponding one of the left lateral portion 12a and the right lateral portion 12b of the vehicle 2 in the reference position (a), in the vicinity of a middle position thereof in the vehicle traveling direction, as shown in FIG. 9. Further, each the rear edge line 57 of the left movable zone 53 and the rear edge line 58 of the right movable zone 55 may be set to have a rear end extending by a length X (allowance corresponding to the width of a human body) perpendicularly from a corresponding one of the left lateral portion 12a and the right lateral portion 12b of the vehicle 3. This makes it easy for the driver to recognize the presence of a person or the like being close to the left lateral portion 12a or the right lateral portion 12b of the vehicle 2. Further, the above embodiment has been described based on an example where the vehicle 2 is driven forwardly. Differently, when the vehicle 2 is driven backwardly, the traveling road surface section A is set to extend rearwardly from the side camera (7, 9).

LIST OF REFERENCE CHARACTERS

1: in-vehicle image display system
2: vehicle
7, 9: side camera
11: display unit
15: processing unit
37: planer image
38: central region
40: peripheral region
42: processed image
44: processed section
53: left movable zone
55: right movable zone
62, 64: optical axis of wide-angle lens
A: traveling road surface section
B: peripheral road surface section

The invention claimed is:

1. An in-vehicle image display system equipped in a vehicle to support driving of a driver, comprising:
 a side camera installed to a lateral portion of an exterior of the vehicle to face outwardly and configured to take an image of an area lateral to the vehicle by using a wide-angle lens;
 a processing unit configured to correct a wide-angle image taken by the side camera to generate a planar image, and process the planar image to generate a processed image; and
 a display unit configured to display the processed image transmitted from the processing unit on a screen,
 wherein the processing unit is operable to set a position of the vehicle at a predetermined setup vehicle speed, as a reference position,
 wherein the processing unit is operable to set a position which is reached by a part of a contour of the vehicle located at a farthermost position with respect to a center of the vehicle in the reference position as a reachable position, in a position of vehicle where the vehicle has stopped by being decelerated from the reference position under a maximum steering angle and a predetermined braking force, and
 wherein the processing unit is operable to execute a secondary processing of the planar image so as not to include an image region located outward from the reachable position in a vehicle-width direction, in order to generate the processed image.

2. The in-vehicle image display system as recited in claim 1, wherein the reachable position is defined based on: a free running distance which is a traveling distance of the vehicle in the vehicle-width direction as measured based on the setup vehicle speed and the maximum steering angle during a time period from a time when the driver recognizes an object through until the driver starts a braking action; and a braking distance which is a traveling distance of the vehicle in the vehicle-width direction as measured based on the setup vehicle speed and the maximum steering angle during a time period from a time when the driver starts the braking action through until the vehicle is stopped.

3. The in-vehicle image display system as recited in claim 1, wherein an optical axis of the wide-angle lens is set to extend toward a give position of a traveling road surface section, such that a contrast ratio in an image region of the traveling road surface section taken until the part of the contour of the vehicle reaches the reachable position becomes 30% or more.

4. An image processing method for an in-vehicle image display system for supporting driving of a driver, comprising the steps of:
 receiving a wide-angle image taken by a side camera configured to take an image of an area lateral to a vehicle, through a wide-angle lens of the side camera;
 correcting the wide-angle image to generate a planar image, and processing the planar image to generate a processed image;
 setting a position of the vehicle at a predetermined setup vehicle speed, as a reference position;
 setting a position which is reached by a part of a contour of the vehicle located at a farthermost position with respect to a center of the vehicle in the reference position as a reachable position, in a position of vehicle where the vehicle has stopped by being decelerated from the reference position under a maximum steering angle and a predetermined braking force; and
 executing a secondary processing of the planar image so as not to include an image region located outward from the reachable position in a vehicle-width direction, in order to generate the processed image.

* * * * *

UNITED STATES PATENT AND TRADEMARK OFFICE
CERTIFICATE OF CORRECTION

PATENT NO. : 10,696,231 B2
APPLICATION NO. : 16/494703
DATED : June 30, 2020
INVENTOR(S) : Yoshiaki Matsuba et al.

Page 1 of 1

It is certified that error appears in the above-identified patent and that said Letters Patent is hereby corrected as shown below:

On the Title Page

Item (72), delete "Seishi Nakamura, Iwankuni (JP);"
Insert --Seishi Nakamura, Iwakuni (JP);--

Signed and Sealed this
Eighteenth Day of August, 2020

Andrei Iancu
*Director of the United States Patent and Trademark Office*